United States Patent [19]

Belohlawek et al.

[11] 4,350,716

[45] Sep. 21, 1982

[54] PROCESS FOR THE PRODUCTION OF A FINE GRAINED MULTIPLE LACTATE AND ITS USE AS A BAKING AGENT

[75] Inventors: Lothar Belohlawek, Freising; Wolfgang Weber, Munich, both of Fed. Rep. of Germany

[73] Assignee: Dimalt Aktiengesellschaft, Munich, Fed. Rep. of Germany

[21] Appl. No.: 103,419

[22] Filed: Dec. 13, 1979

[30] Foreign Application Priority Data

Dec. 15, 1978 [DE] Fed. Rep. of Germany ....... 2854291

[51] Int. Cl.$^3$ .............................................. A21D 2/14
[52] U.S. Cl. ................................... 426/626; 426/622; 426/634; 426/653
[58] Field of Search ............... 426/653, 615, 618, 622, 426/96, 626, 634

[56] References Cited

U.S. PATENT DOCUMENTS 1,282,868  10/1918  Kohman et al. .................... 426/653
1,966,013   7/1934  Komm ................................. 426/653
2,033,009   3/1936  Rosenthal ........................... 426/653

OTHER PUBLICATIONS

Hawley, "The Condensed Chemical Dictionary", 9th Ed., VNR Co., N.Y. 1977, p. 156.
Pyler, "Baking Science and Technology", vol. II, Siebel Pub. Co., Chicago, Ill. 1952, p. 765.
Pyler, *Baking Science and Technology, vol. 1, Siebel Pub. Co., Chicago, Ill., 1952, p. 148.*

Primary Examiner—Raymond N. Jones
Assistant Examiner—Elizabeth A. Hatcher
Attorney, Agent, or Firm—Roylance, Abrams, Berdo & Farley

[57] ABSTRACT

There is disclosed a fine-grained multiple lactate concentrate for use in baking agents and finished flours comprising (1) a cereal product, (2) lactic acid, (3) a basic calcium compound and (4) a water binding agent.

8 Claims, No Drawings

PROCESS FOR THE PRODUCTION OF A FINE GRAINED MULTIPLE LACTATE AND ITS USE AS A BAKING AGENT

BACKGROUND OF THE INVENTION

1. Field of the Invention

This invention relates to the production of multiple lactates for use in baking agents and finished flours.

2. Description of the Prior Art

Lactic acid and calcium lactate are frequently used in a bakery. For example, in the production of acidified baking agents with so-called swelling flours, a suspension of starch or a natural substance containing starch, e.g., cornmeal, rice flour, or wheat flour, is gelatinized by boiling in the presence of lactic acid. The gelatinized starch is then dehydrated on roller dryers and the dried material is then comminuted.

Lactic acid is a viscous, hygroscopic liquid which solidifies at room temperature and is therefore difficult to handle.

It is known to produce lactic acid calcium salts which contain lactic acid, or so-called multiple lactates, which may be employed in the place of lactic acid in the form of non-hygroscopic, solid crystal powder. For example, German Pat. No. 346 521 describes the production of a solid lactic acid which may be used for technical and pharmaceutical purposes. Five, six or more molecules of lactic acid can combine with a molecule of calcium lactate resulting in a powdered, crystalline lactic acid preparation with a high (65 to 70%) available lactic acid content (German Pat. No. 745 526, German Food Review 1940, 11/14). The disclosures of each of these references are incorporated herein by reference.

A disadvantage of these known multiple lactates is that they are obtained in the form of a crystalline paste and only through subsequent processing and drying can they be formed into a powder so that they may then be mixed with other dry powdered substances. Furthermore, there is no industrial process by which multiple lactates may be produced economically.

Mechanization and streamlining in the baking industry require the availability of baking substances which are not only best for the technology of bread production and which improve the quality and taste of the product, but which also can be efficiently produced and easily handled, transported and stored without the components separating or the material becoming lumpy so that the dough in which they are used may be processed by machines.

SUMMARY OF THE INVENTION

It is an object of this invention to provide powdered or fine-grained, homogeneous, non-separating multiple lactates in baking agents and finished flours. This object is accomplished by providing a sepcial process for the production of a fine-grained multiple lactate for use within a baking agent mixture. The concentrates thus produced may be used for the production of baking agents or premixes for baking or they can be further processed immediately into finished baking substances and flours in a single operation.

In accordance with this invention, there is provided a fine-grained multiple lactate concentrate within a baking substance mixture. this concentrate comprises (1) a cereal product, (2) lactic acid, (3) a basic calcium compound and (4) a water binding agent. Preferably, the cereal product comprises 30 to 55 weight percent of the mixture, the lactic acid comprises 15 to 40 weight percent of the mixture, the basic calcium compound comprises 2 to 6 weight percent of the mixture and an effective amount of a water binding agent comprises 2 to 10 weight percent of the mixture. In preparing this mixture, the basic calcium compound is mixed with the cereal product. This mixture is then sprayed with lactic acid and allowed to react for 15 to 20 minutes with continual mixing. there is then added to the mixture the water binding compound, such as $CaSO_4 \cdot \frac{1}{2} H_2O$. The product may then be dried in a vacuum or by being conducted over an electric dryer. The quantities of the various ingredients are selected so as to provide a powder mix containing a multiple lactate which may be used as a baking agent premix or as a baking agent.

Examples of cereal products which may be used include, for example, cornmeal, rice flour, soy bean flour, rye flour or mixtures thereof. The reaction mixture may also contain additives that are usually employed in baking substances, e.g., lecithin, phosphate, saccharide, etc.

Commercial 80% lactic acid is usually employed in the practice of this invention although other concentrations may also be used.

The basic calcium compound may be calcium oxide (CaO), calcium hydroxide ($Ca(OH)_2$) and calcium carbonate ($CaCO_3$).

Suitable water binding agents include guar and carob flour, both of which bind water colloidally. The preferred water binding compound is $CaSO_4 \cdot \frac{1}{2} H_2O$ which reacts by absorption of $1\frac{1}{2}$ moles $H_2O$.

The practice of this invention results in the formation of fine crystalline multiple lactates within the baking substance mixture which has the advantage of large surface area and the presence of crystal nuclei. Since the residual water and the water resulting from the reaction is largely trapped, only in special cases is it necessary to dry the product in a vacuum or by means of an electric dryer. The practice of this invention yields powdered mixtures which in their dried state are inert and liberate the lactic acid from the crystal binding only in the presence of water. This is in contrast to conventional acidified baking agents in which the lactic acid is adsorptively bound.

DESCRIPTION OF THE PREFERRED EMBODIMENTS

In a most preferred embodiment of this invention there is produced a premix for a baking agent, which may be used as a concentrate for the production of a baking agent or a finished flour in which the ingredients are combined in the following proportions:

30–55% of the desired mixture of cereal products, e.g., cornmeal, rice flour, wheat flour, soy bean flour, or rye flour, 35–40% lactic acid-80%, sprayed on 3–6% CaO, $Ca(OH_2)$ or calcium carbonate, 5–10% $CaSO_4 \cdot \frac{1}{2} H_2O$.

The concentrates thus produced serve as pre-mixtures for the production of various baking agents.

For producing a baking agent for mixed rye bread, the following mixture is suggested by way of example:

65% concentrate of this invention,

4% vegetable swelling agent, such as fine guar flour, carob flour,

4% lecithin,

15% mono- or disaccharide,

10% cornmeal,

2% calcium hydrogen phosphate.

For producing a baking agent for mixed wheat bread, the following mixture is suggested by way of example:

45% concentrate of this invention,
6% vegetable swelling agent as above,
4% lecithin,
34% cereal products as above,
1% tricalcium phosphate,
2% sodium diacetate,
8% calcium acetate.

After these substances are mixed, 0.067% of ascorbic acid is added.

With appropriate variations of conventional additives to the concentrate of this invention, such as emulsifying agents, vegetable swelling agents, calcium phosphate, etc., one may produce the entire range of baking agents from rye bread to the various mixed types of wheat bread.

According to the process of this invention, finished baking agents of various compositions and degrees of acidity can also be prepared in a single operation. For this purpose, the following ingredients are employed:

50% cornmeal or other cereal product,
7% soy flour and 2% calcium oxide are mixed vigorously.
20% lactic acid (80%) is sprayed onto this mixture. This mixture is allowed to react for about 20 minutes.
2% calcium sulphate.$\frac{1}{2}H_2O$ is then added, thoroughly mixed and cooled.
5% guar is added and mixed for another 10 minutes.
4% lecithin,
2% sodium acetate.$CH_3COOH$ (sodium diacetate), and
8% calcium acetate are added and mixed.
0.07% ascorbic acid is added.

For the production of a baking agent for mixed rye bread in a single procedural step, the following process is employed:

39% cornmeal or other cereal product,
5% soy bean flour, and
3% calcium oxide are mixed vigorously.
33% lactic acid (80%) is sprayed onto this mixture.
7% calcium sulphate.$\frac{1}{2}H_2O$ is added with continual mixing. The mixture is dried by means of a vacuum or by movement over an electric dryer.
4% guar,
4% lecithin and
5% calcium hydrogen phosphate are added and thoroughly mixed.

It is preferred to conduct the process of this invention by thoroughly mixing the cereal products with the calcium compound, spraying lactic acid onto this mixture and allowing it to react for 15 to 20 minutes under continual stirring. The product is allowed to cool and is combined with water binding agent and, if necessary, dried under vacuum or over an electric dryer.

After the lactic acid has been added, the mixture is heated to 60° to 70° C. This temperature is maintained during the reaction and the mixture is then cooled for further mixing. It is preferred to employ a turbo mixer for the blending. The process may also be conducted in an extruder which not only allows the effective reaction of the components but also hydrolyzes the starch contained in the cereals used. In this manner, the addition of vegetable swelling agents such as fine guar flour, etc., can be omitted entirely or in part, both in the production of baking agents or in the corresponding concentrates for the production of baking agents, since the swollen starch takes over the function of the swelling agent which is indispensable for baking agents for rye baking agents.

All percentages recited hereinabove are by weight.

We claim:

1. In a process for preparing a lactate concentrate in which 2–6 weight percent of a basic calcium compound is mixed with 30–55 weight percent of a cereal product, the mixture is then contacted with 15–40 weight percent of lactic acid and the resultant combination is allowed to react for the desired period of time to form a reaction product, the improvement which comprises adding to the reaction product, 2–10 weight percent of $CaSO_4.\frac{1}{2}H_2O$, all weights being based on the weight of the concentrate, whereby a fine-grained multiple lactate concentrate is obtained.

2. The process of claim 1, wherein the lactic acid is commercial 80% lactic acid.

3. The process of claim 1, wherein the cereal product is selected from the group consisting of corn meal, rice flour, soy bean flour, rye flour and mixtures thereof.

4. The process of claim 3, wherein the calcium compound is selected from the group consisting of calcium oxide, calcium hydroxide and calcium carbonate.

5. The process of claim 4, wherein the contacting of the basic calcium compound and cereal product combination with lactic acid is conducted by spraying the combination with lactic acid.

6. The fine-grained multiple lactate concentrate produced by the process of claim 1.

7. The fine-grained multiple lactate concentrate produced by the process of claim 5.

8. A baking agent for use in the production of baked goods which includes as an essential component thereof the concentrate defined in claim 6.

* * * * *